United States Patent
Shah

(10) Patent No.: US 10,679,264 B1
(45) Date of Patent: Jun. 9, 2020

(54) REVIEW DATA ENTRY, SCORING, AND SHARING

(71) Applicant: Dev Anand Shah, Liberty Township, OH (US)

(72) Inventor: Dev Anand Shah, Liberty Township, OH (US)

(*) Notice: Subject to any disclaimer, the term of this patent is extended or adjusted under 35 U.S.C. 154(b) by 354 days.

(21) Appl. No.: 15/353,642

(22) Filed: Nov. 16, 2016

Related U.S. Application Data

(60) Provisional application No. 62/257,122, filed on Nov. 18, 2015.

(51) Int. Cl.
| | |
|---|---|
| *G06Q 30/02* | (2012.01) |
| *G06F 3/0488* | (2013.01) |
| *G06F 3/0484* | (2013.01) |
| *G06Q 50/12* | (2012.01) |
| *G06Q 50/10* | (2012.01) |
| *G06F 3/0485* | (2013.01) |

(52) U.S. Cl.
CPC ..... *G06Q 30/0282* (2013.01); *G06F 3/04847* (2013.01); *G06F 3/04883* (2013.01); *G06Q 50/10* (2013.01); *G06Q 50/12* (2013.01); *G06F 3/04855* (2013.01); *G06F 2203/04803* (2013.01)

(58) Field of Classification Search
CPC .... G06Q 30/0282; G06Q 50/10; G06Q 50/12; G06F 3/04883; G06F 3/04847; G06F 3/04855; G06F 2203/04803
See application file for complete search history.

(56) References Cited

U.S. PATENT DOCUMENTS

| | | |
|---|---|---|
| 6,611,842 B1 | 8/2003 | Brown |
| 7,032,178 B1 | 4/2006 | McKnight et al. |
| 8,645,853 B2 | 2/2014 | Prinsen et al. |
| (Continued) | | |

FOREIGN PATENT DOCUMENTS

WO     WO-2013116708 A1 * 8/2013

OTHER PUBLICATIONS

Susan Wyse, "Combine Multiple Choice and Comment Survey Questions into a Grid", Jan. 17, 2013, Snapsurveys.com, all pages (Year: 2013).*

(Continued)

*Primary Examiner* — Kieu D Vu
*Assistant Examiner* — Roberto Borja
(74) *Attorney, Agent, or Firm* — Fish & Richardson P.C.

(57) ABSTRACT

Methods, systems, and apparatus, including computer programs encoded on computer storage media, for receiving, processing, and presenting user reviews, or logging user experiences, with products and services, e.g., restaurant services. One aspect is a method providing user interface elements including a region having panels each for receiving ratings of a general aspect of the product or service, a region having panels each for receiving ratings of a specific item of the product or service, where each panel includes an analog user interface element to input a rating and presents an image corresponding to the rating. Another aspect is a method that includes providing for each panel an analog user interface element for a user to input a rating for a corresponding item of the product or service, and accepting as a completed review a review input by the user that does not include any text input by the user.

11 Claims, 5 Drawing Sheets

(56) References Cited

U.S. PATENT DOCUMENTS

| | | |
|---|---|---|
| 8,996,511 B2 | 3/2015 | Kelly |
| 2001/0047357 A1 | 11/2001 | Vaithilingam et al. |
| 2002/0103692 A1 | 8/2002 | Rosenberg |
| 2004/0012588 A1 | 1/2004 | Lulis |
| 2004/0148210 A1* | 7/2004 | Barrett ............ G06Q 17/30873 705/7.32 |
| 2005/0038717 A1 | 2/2005 | McQueen et al. |
| 2007/0027830 A1 | 2/2007 | Simons et al. |
| 2007/0061209 A1 | 3/2007 | Jackson |
| 2007/0078670 A1 | 4/2007 | Dave et al. |
| 2007/0143411 A1 | 6/2007 | Costea et al. |
| 2008/0077574 A1 | 3/2008 | Gross |
| 2008/0086368 A1 | 4/2008 | Bauman et al. |
| 2008/0097835 A1 | 4/2008 | Weiser et al. |
| 2008/0141366 A1 | 6/2008 | Cross et al. |
| 2008/0172412 A1 | 7/2008 | Gruhl et al. |
| 2009/0100455 A1 | 4/2009 | Frikker |
| 2009/0240674 A1 | 9/2009 | Wilde et al. |
| 2009/0281988 A1 | 11/2009 | Yoo |
| 2010/0146007 A1* | 6/2010 | Kononov ............ G06F 17/3053 707/802 |
| 2013/0024465 A1* | 1/2013 | Schiff ............ G06F 17/30873 707/749 |
| 2013/0166461 A1* | 6/2013 | Austin ................ G06Q 50/184 705/310 |
| 2014/0115055 A1* | 4/2014 | Jackson ............ G06Q 30/0282 709/204 |
| 2014/0156640 A1 | 6/2014 | Bombolowsky et al. |
| 2014/0157145 A1* | 6/2014 | Bush ...................... G06Q 50/01 715/745 |
| 2014/0193794 A1* | 7/2014 | Olander, III ....... G06Q 30/0203 434/362 |
| 2014/0200879 A1 | 7/2014 | Sakhai et al. |
| 2014/0273993 A1 | 9/2014 | Grappo |
| 2014/0324885 A1 | 10/2014 | McKenzie |
| 2014/0337703 A1 | 11/2014 | Gong et al. |
| 2015/0006303 A1 | 1/2015 | Little |
| 2015/0058255 A1 | 2/2015 | Cork |
| 2015/0186036 A1 | 7/2015 | Abate |
| 2015/0220598 A1 | 8/2015 | Liensberger et al. |
| 2015/0334121 A1* | 11/2015 | Hernberg ............ H04L 63/0428 713/171 |
| 2016/0253719 A1* | 9/2016 | Akpala ............. G06O 30/0282 705/347 |
| 2017/0011063 A1* | 1/2017 | Lee ...................... G06Q 10/101 |

OTHER PUBLICATIONS

Anne Dorko, "Toggle (Enable and Disable) a form field with a checkbox", Jul. 23, 2009, Annedorko.com, All pages (Year: 2009).*

* cited by examiner

REVIEW DATA ENTRY, SCORING, AND SHARING

CROSS-REFERENCE TO RELATED APPLICATION

This application claims the benefit under 35 U.S.C. § 119(e) of the filing date of commonly-owned U.S. Patent Application No. 62/257,122, for Review Data Entry, Scoring, and Sharing, which was filed on Nov. 18, 2015, which is incorporated here by reference.

BACKGROUND

This specification relates to a user interface for quickly logging information, in particular, a user interface for quickly logging restaurant review information on a mobile device such as a smart phone.

Small portable computing devices, e.g., smart phones and tablets, support a wide variety of specialized applications and services that exploit the high computing power, high screen resolution, wireless network connectivity, location awareness, cameras, and touch-based user interfaces that characterize such devices.

Users can download and install small specialized applications, or "apps", to their personal portable computing devices to perform specific functions or to enjoy particular services. As used in this specification, the term application may refer to any type of standalone or Internet-connected application, program, or software module executed in any part of a computing environment, whether of a small portable single-user device like a smart phone or of a larger device like a personal computer or a server. The term app will be reserved for an application that is installed and runs on a small personal mobile computing device with a touch screen interface, e.g., a smart phone or tablet.

SUMMARY

This specification describes technologies for collecting and presenting information from and to a user logging and reviewing products and services. One aspect of these technologies generally involves innovative arrangements of user interface elements that make it easy for a user to enter information. Another aspect generally involves innovative scoring methods to rank reviews for presentation to a user.

In general, one innovative aspect of the subject matter described in this specification can be embodied in methods that include the actions of presenting, on a user device, a user interface to receive input from a user. The user interface includes elements to receive a review from the user of a product or service. The elements include a region having two or more panels each for receiving ratings of a respective general aspect of the product or service, and a region having two or more panels each for receiving ratings of a specific experience with a respective item of the product or service. In each of the panels, the elements include an analog user interface element for a user to use to input a rating for the corresponding specific item of the product or service and an image corresponding to the rating set by the user in the analog user interface element of the panel.

Other embodiments of this aspect include corresponding computer systems, apparatus, and computer programs recorded on one or more computer storage devices, each configured to perform the actions of the methods.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In general, another innovative aspect of the subject matter described in this specification can be embodied in methods that include the actions of presenting, on a user device, a user interface to receive input from a user. The user interface includes elements to receive a review from the user of a product or service. The user interface elements include multiple panels each for receiving one or more ratings of a respective aspect of the product or service. The method also includes the actions of providing, as a user input element for each panel, a respective analog user interface element for a user to use to input a rating for a corresponding item of the product or service; presenting, in each of the panels when the panel is open, an image corresponding to the rating set by the user in the analog user interface element of the panel; and accepting as a completed review the review input by the user, wherein the review input does not include any text input by the user.

Other embodiments of this aspect include corresponding computer systems, apparatus, and computer programs recorded on one or more computer storage devices, each configured to perform the actions of the methods.

The subject matter described in this specification can be implemented in particular embodiments so as to realize one or more of the following advantages. The user interface allows a user to enter review information quickly and intuitively. The user interface can be implemented in a feedback application to provide information on site to a restaurant or other service establishment to provide real-time feedback on various aspects of users' experiences. The user interface allows a user to share the content the user entered across social media networks that a user has linked with the app. The presentation of the review information allows a user to quickly interpret the review information from other users.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
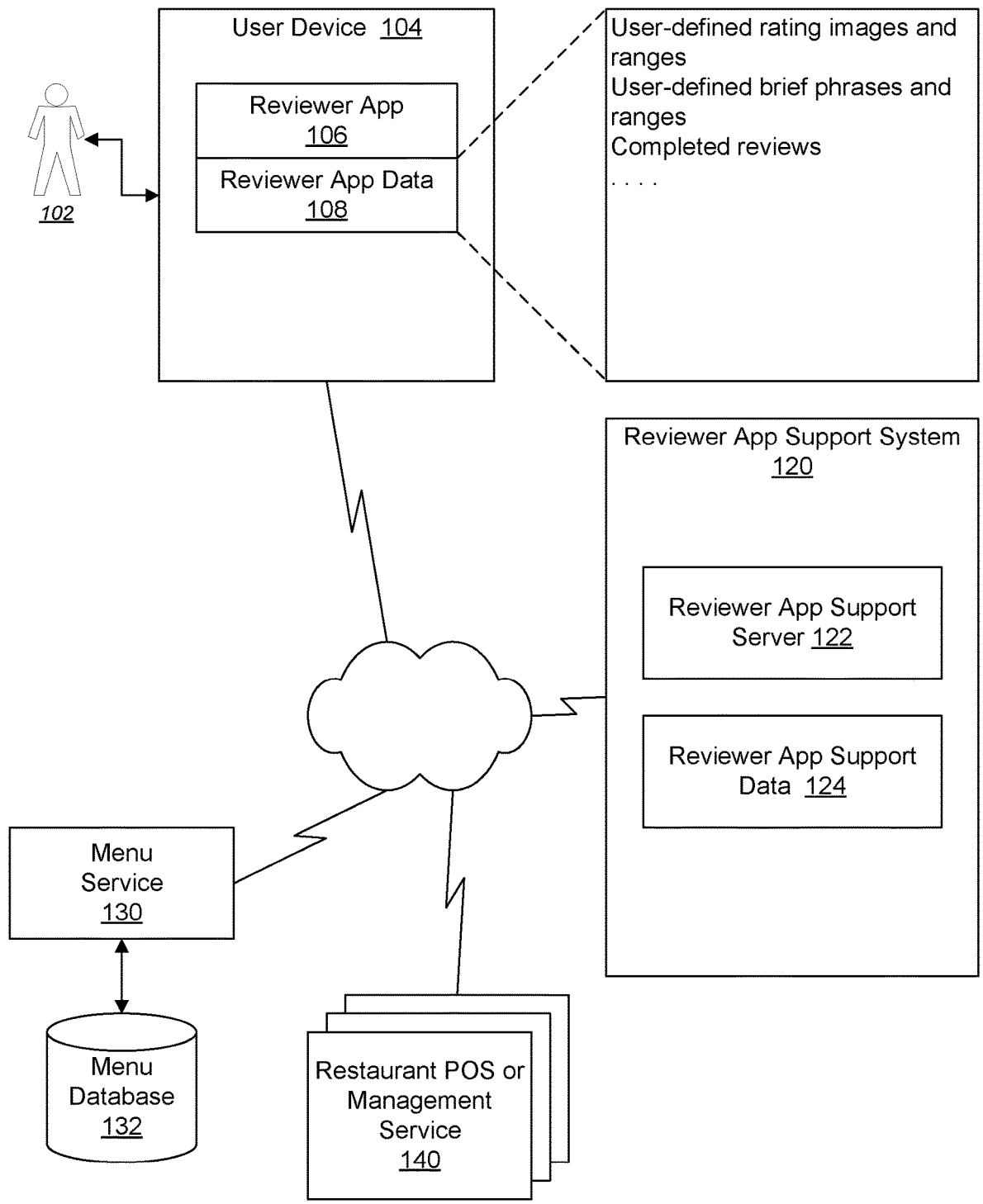
FIG. 1 shows a system architecture supporting a review data entry application.

FIG. 1 illustrates a system that includes a user device 104 on which a reviewer app 106 is installed for use by a user 102. The reviewer app maintains and uses reviewer app data 108 that is stored on the user device. The reviewer app data, and preferably additional data that may be used by the reviewer app, may also be stored on a reviewer app support system 120 that includes one or more reviewer app support servers 122 and that includes data storage devices that store reviewer app support data 124.

The user device may be any form of computing device that a user can use to run the reviewer app. For example, it can be a smart phone, a wearable computer, a tablet computer, or a laptop computer. Preferably, the user device is a mobile device that supports both gesture and text input, which may be in the form of speech-to-text or script (i.e., handwriting) input support. The user device may be one that runs any operating system that supports a graphical user interface, e.g., an Apple iOS, a Google Android, a Microsoft Windows, or an Amazon Fire operating system. The device preferably has a keyboard, which may be a virtual or a physical keyboard, and a camera.

The reviewer app support system 120 is implemented on one or more computers in one or more locations that communicate with the user device 104, and, in general, many other user devices, over a data communication network. The network may include wireline connections, wireless connections, or both. Similarly, the support servers are implemented on one or more computers and the support data is stored on one or more storage devices, all of which may be located in one or more physical locations. The reviewer app support system 120 having one or more reviewer app support servers 122 and storage devices storing reviewer app support data 124.

Not shown are connections and data relating to authentication and authorization of users of the app, or links to social networks, which the app and support system use when saving and sharing reviews.

To support user entry of restaurant reviews specific to each user's experience, the reviewer app running on the user device may obtain restaurant data, e.g., menu data, through network connections from a third-party menu service and restaurant data service 130 that provides data from a menu database 132. In this specification, the term "database" broadly refers to any collection of data: the data does not need to be structured in any particular way, or structured at all, and it can be stored on storage devices in one or more locations.

The data may flow directly from the menu service to the user device, the data may flow through the reviewer app support system, or both. If the menu data obtained by the app is incomplete or incorrect, the app can optionally allow the user to provide additional or corrected menu data. The additional data can include menu items not included in the menu data; the corrected data can include corrections to descriptions and prices, if any.

Instances of the reviewer app may optionally connect directly to a vendor service of the vendor being reviewed, e.g., any one of possibly multiple restaurant point of sale or management services 140, either directly or through the reviewer app support system 120.

Figure 2A:
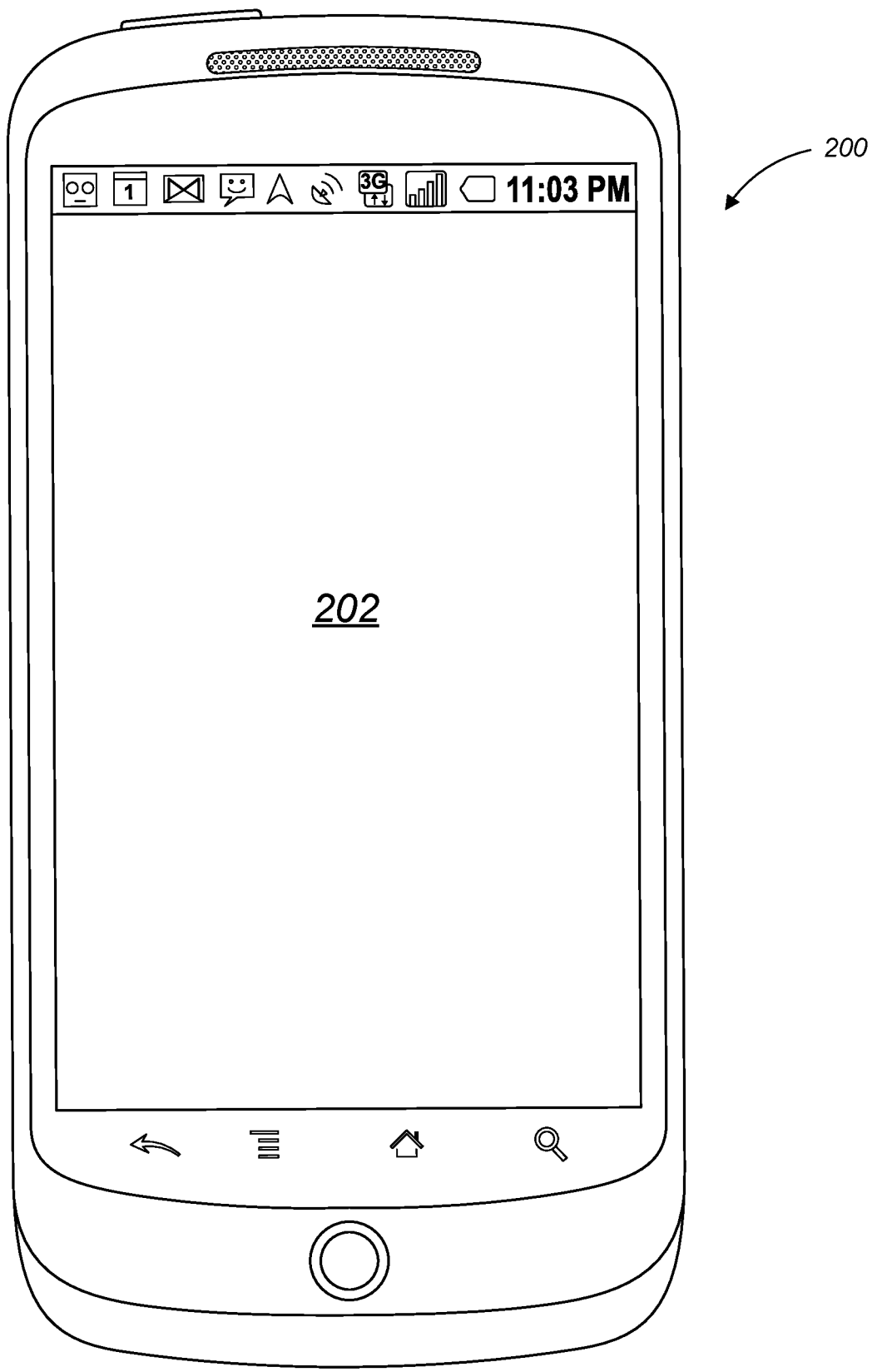
FIGS. 2A, 2B, 2C (collectively, "FIG. 2") show a user interface.

FIG. 2 illustrates an example user device 200 with a user interface 202 provided by the reviewer app 106 (FIG. 1) running on the user device 200. This is an example of the user device 104 illustrated in and described in reference to FIG. 1. The illustrated user device 200 is a smart phone with a touch screen interface and other conventional capabilities.

A user 102 of the app will generally want to set up a profile for himself or herself. In the profile, the user can specify a number of personal preference, e.g., for types of food or ranges of prices, for locations, and so on. The user can also specify the social networks and media the user has accounts with and that the user wants to use in sharing reviews and sharing location and other information with friends who are linked to the user through one or more of the social sites. Also, in scoring restaurants, linked social networks' friend lists can be used when calculating the weighted average reviews users see, to give more importance to the reviews from users in their social networks, as described in more detail below. In some implementations, reviews from people outside of a user's social network may be ignored altogether.

On the other hand, in some implementations, the user can use the app without having a profile.

A user 102 of the app, after starting the app, can begin entering a review, also called a "log," of a restaurant experience by entering some information identifying the restaurant, e.g., a name and a city, e.g., after selecting an add button 204. The app and support system allow a user to submit multiple reviews for any particular restaurant, since each review reflects a particular user experience.

The user device can optionally store reviewer app data 108 that includes information about restaurants that are local to the geographic location of the user device. A reviewer app support system 120 can maintain reviewer app support data 124 that includes a larger restaurant database. Using the local or larger database or both, the app can interact with the user to determine a restaurant identifier that identifies the restaurant unambiguously, for example, using a search interface.

The app can use restaurant data stored locally in the user device as part of the reviewer app data 108 or in the reviewer app support server system as part of the support data provided, or the app can use restaurant data from a third-party menu database 132 provided by a third-party menu and restaurant data service 130 over the Internet. The app can optionally use data from more than one of these sources.

The app can optionally present a list of restaurants near the current location of the user device, e.g., as part of a search functionality that enables the users to search for local restaurants, defined either in distance or time of travel from the current location, optionally filtered by one or more of (i) distance, (ii) ratings by friends, with links to friends' reviews, the friends linked from one or more of the user's social media accounts, (iii) restaurants previously flagged by the user, or (iv) restaurants previously logged or reviewed by the user. The user can select one of the listed restaurants as the restaurant the user will review.

The app can optionally identify the restaurant from a machine readable code, e.g., a bar code or a two-dimensional bar code, or manually provided by the restaurant on a menu or otherwise.

When the user has selected a restaurant, either through the search interface or otherwise, the app may use the area 206 to show the name of the restaurant and use the area 206 as a search interface through which the user can search the menu items.

Also, when the user has selected a restaurant, the app may use the add button 204 as the element by which the user can open in interface pane to add a menu item to the menu.

The user interface includes a top row of tabs 210 that the user can select to bring up different aspects of the user interface.

A review will generally include review information from the user about common items, i.e., answers to questions that apply generally to restaurants and that any user can answer, and specific items, i.e., answers to questions that are specific to a particular restaurant experience, e.g., questions about items on the menu of the restaurant.

The user interface includes a region for input of ratings for common or general aspects 220. This is shown as opened in FIG. 2B. The region includes multiple panels 222, 224, 226, each one for a distinct category of information: an ambiance panel 222 for information about the ambiance of the restaurant; a price panel 224 for information about the prices charged by the restaurant; and a service panel 226 for information about the service provided by the restaurant. These panels all address general aspects of the user's experience at the restaurant, items that any reviewer would be able to rate.

The ambiance panel, like other general item panels, is illustrated open. The open-closed button 230 is set open. In some implementations, general item panels are open by default, while specific item panels are closed by default and must be set to open by the user.

The ambiance panel includes a pull-down menu 232 from which the user can select a kind of occasion or situation that the restaurant is good for, by way of making a comment about the ambiance of the restaurant. The choices can include, for example, a quick bite, meals with friends, family time, business meals, date nights, happy hour, and drinks. Optionally, the user will be able to select multiple "good for" categories.

The ambiance panel, like other panels, includes a scroll bar 236 with a slider 238 that the user can move, from a most negative position, which is shown in the figure, to a most positive position, to rate the ambiance of the restaurant. The app links the position of the slider to a rating image 234, which changes as the user changes the rating by moving the slider. The image represents a qualitative description of the user's rating input. The app also links the position of the slider to a brief phrase that expresses the meaning of the user's rating input.

Both the phrase and the image can be drawn from a set of default values for the slider position. The mapping of slider positions to images can be determined by a default mapping.

The app can also optionally include a user interface to accept from the user, to store locally in the reviewer app data 108, images and corresponding ranges and phrases and corresponding ranges. Depending on whether such user-defined data is available, the app will select the rating image and brief phrase according to which image range and phrase range the slider position corresponds to. The image and phrase ranges may be the same or different, and there may be different numbers of ranges for images and phrases. The user can optionally include user-provided images, user-provided phrases, and corresponding ranges, with the reviews and allow them to be seen by others who are permitted to view the review.

The illustrated price panel shows a second scroll bar 242 and corresponding, possibly user-defined, text 240 relating to the range of prices in which the prices charged by the restaurant fall. The default text choices, according to the position of the slider on the price range scroll bar, in one implementation, are <$10, $10-$25, $25-$50, $50-$100, and $100+. Optionally, the user can define his or her own set of choices. The text is selected by the app according to the position of the corresponding slider.

The illustrated price panel shows a first scroll bar 246 and corresponding, possibly user-defined, text 244 that expresses the meaning to the user of the rating the user entered on the slider. This rating relates to the prices charged by the restaurant for the items the user and perhaps the user's party ordered. In some implementations, the default texts for this scroll bar are "What was that?", "I was expecting more", "I got what I paid for", "That was impressive", and "I will remember this forever".

As with images, described above, the text can be drawn from default values set for default ranges of the slider position, or it can be drawn from values and position ranges provided by the user.

Optionally, each panel may include a camera button 250 that will cause a camera app or function of the user device to be activated. The user may attach one or more photos that the app can attach to the review or preferably automatically attach to the corresponding part of the review, i.e., the part corresponding to the panel.

Optionally, each panel may include a text button 252 that will cause a text input area to be opened in which the user can enter text that will be included in the corresponding part of the review. In some implementations, an area below the panel slides open for text entry.

The user interface also includes one or more regions for input of information in categories that are specific to the user's particular experience at the restaurant, e.g., ratings of specific menu items selected by the user. For example, among the specific aspects, the user interface can include menu regions 212 for each of one or more kinds of menu items. The illustrated menu regions 212 are closed, and include a region for "Soup and Salads" items and a region for "Cold Sandwiches" items. These headings and the items under them are derived from the representation in the restaurant data of the menu of the restaurant. Generally, this data will come in a structured form that the app can follow in presenting the menu on the user interface. Other panels for information specific to a particular experience may also be included, e.g., a panel for cleanliness or a panel for speed or other qualities of the service.

The user interface also includes a button 214 that the user can select to submit the review or log. When the user submits the review, any number of panels may be open, as determined by the respective settings of the open-closed buttons 230 of the panels. If the user closes the button of a panel, the input to that panel will be kept. In some implementations, that input will be included in the review that is submitted, regardless of the setting of the button at the time of submission. In other implementations, any input in a panel that is closed at the time the user submits the review will be discarded and not included in the review.

The user interface also includes a menu bar 216 from which the user can select buttons to perform common functions.

For example, the user can select a home button on the menu bar 216 to bring up a home screen of the app. On the home screen, the app can display one or more user interface elements by which the user can access the following kinds of information: (i) Nearby—a list of restaurants within a given distance, sorted by user specific rating or other, user selected sorting key; (ii) Friend Feed—a list of recent reviews from the user's friends, which may be pulled from one or more linked social media accounts, e.g., Facebook, Twitter, and so on; (iii) My Saves—a list of restaurants previously flagged by the user; and (iv) My Logs—a list of the user's reviews.

Social media integration within the app is bidirectional. The review information provided within the app is significantly influenced by the user's social media network. At the same time, the app makes sharing the user's review input and photos across multiple social media networks a simple process.

The information provided by the app is significantly influenced by the user's social media network. The overall ratings for restaurants, general aspects, and specific aspects are calculated using a weighted average formula that gives more value to ratings from other users within the user's linked social media networks, as described below. Also, the reviews from people within their social media networks are listed first in any review listings, by default. In some instances, only the reviews from people within their social media networks are listed.

When the user saves a review, or later, the user can specify through the user interface whether the review will be shared, and if shared, whether publicly or only with a user selected group or group of friends. The app also makes sharing the user's review input and photos across multiple social media networks a simple process. At the end of each review or log input, the user has the option to upload pictures from the log or post a link to the log on any of the social media accounts the user has linked to the app.

When the user posts a link, app allows the user to select one of the pictures in the review, if any, to use for the link post or the app will select a picture from the user's photos from the log. The app will automatically include in the link post the restaurant name, city, any summary text comment input by the user, and the emoticon associated with the user's overall rating. If there was no summary text comment input by the user, the app will use the short description associated with the overall rating instead.

When the user shares photos, the app will include the restaurant name, city, aspect description, text comment input by the user, and the emoticon associated with the user's rating for that aspect in the message or description of the photo. If there was no summary text comment input by the user, the app will use the short description associated with the overall rating instead. The app may give user the option of creating a folder specifically for the photos from that log. The name of the folder will include the name of the restaurant, as well as any other information the user may decide to include.

Figure 2B:
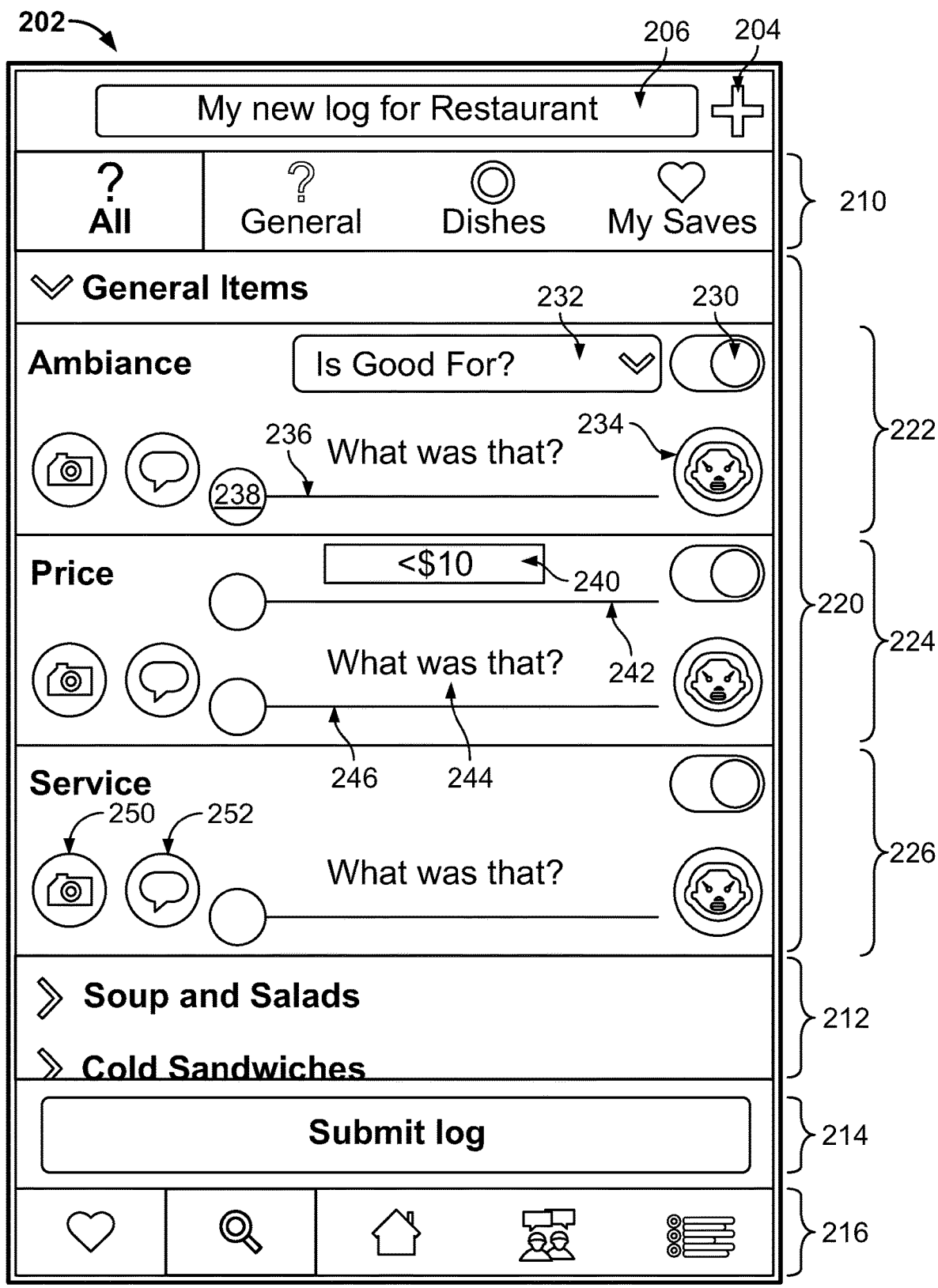
Figure 2C:
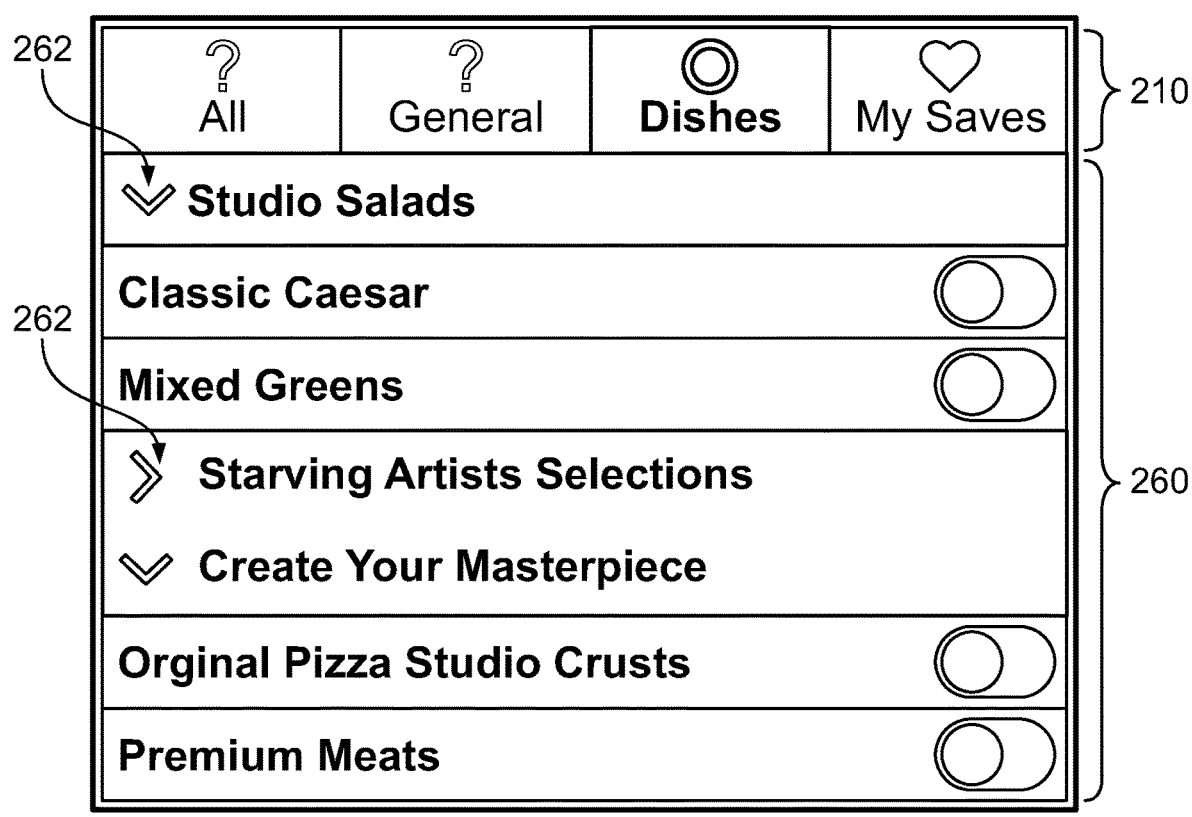

FIG. 2C shows a part of the user interface that is presented by the app with the user selects the Dishes tab from the top row of tabs 210. In response, the app displays the menu dishes part of the user interface 260, which corresponds to the menu regions 212 shown in FIG. 2B. As noted above, all the items are pulled from the restaurant menu information, so they are specific to the restaurant. The categories are expandable lists, which the user can expand by selecting the arrow 262 on the left hand side of the category. When the user selects one of the categories, the list of the dishes in the category are shown. For example, the category Studio Salads shows Classic Caesar and Mixed Greens. As illustrated, these panels are closed until the user opens them.

When the open-closed button for a dish is open, the review input is shown for the specific dish. This allows the user to add the dish to the review. As described above, the data is stored until the review is submitted—even when the button for the item is in the off position, but the data is not part of the review if the button for the item, e.g., the dish, is in the off position when the review is submitted. If the button is in the off position, that part of the user's input is discarded. By default, buttons for the dishes are off to make scrolling through the dishes more manageable for the user.

Figure 3:
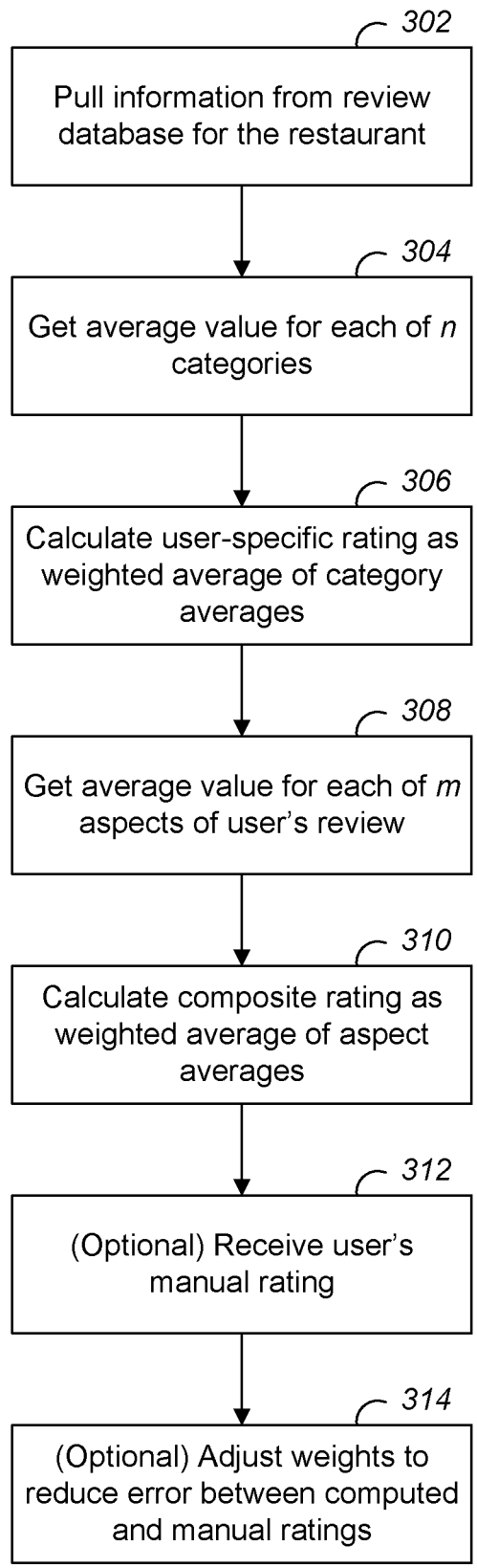
FIG. 3 is a flowchart illustrating a method of using rating information provided through a review data entry application.

FIG. 3 is a flowchart illustrating methods of using rating information provided through a review data entry application. For convenience, the method will be described as being performed by a system of one or more computers, located in one or more locations, and programmed appropriately in accordance with this specification. For example, a review app support system, as described in reference to FIG. 1, appropriately programmed, can perform the methods that will be described.

The system pulls information from the local review database for the specific item being evaluated, specifically in the present examples for a restaurant (302). In some implementations, the restaurant data is broken down into the following three categories: (i) the user's reviews; (ii) friends' reviews, inclusive of the user's own reviews; and (iii) all reviews, inclusive of the friend's reviews.

The system gets the average rating for each category (304) and calculates a user-specific rating of the restaurant from the average rating for each category (306). The user-specific rating satisfies the following formula:

$$\text{user-specific rating} = \Sigma_{i=1}^{i=n} w_i * \text{Average}_i$$

In some implementations, the number of categories n is greater than three.

The term $\text{Average}_i$ represents the average rating for one of the categories. For example, $\text{Average}_1$ can be the average of the ratings of all the user's reviews of the restaurant.

Once the user finalizes his or her individual ratings, the system gets the user's average rating for each of m aspects of the user's review (308). From these averages, the system can create a composite rating for the restaurant (310), using the average rating for each group of aspects, both the general and the specific, according to the following formula:

$$\text{composite rating} = \Sigma_{i=1}^{i=m} w_i * \text{Average}_i$$

In this formula, the term $\text{Average}_i$ represents the average rating for one of the aspects of the review. For example, $\text{Average}_i$ for i=1, 2, and 3 can be the respective averages of the ratings for each of three general items, e.g., ambiance, price, and service, and $\text{Average}_4$ can be the average of the ratings of the food items.

The weights used to calculate the composite rating ($w_i$) will in general be different from the weights used in calculating the user-specific rating and the weights used to calculate each rating may be different from each other.

The system can optionally accept from the user manual adjustments of the ratings (312). The system can change the respective weights ($w_i$) from their initial default value by adjusting the weights according to the user's manual adjustments of the ratings to reduce the difference between the computed ratings and the user's manual ratings (314).

In implementations supporting interaction with, for example, a restaurant point of sale or management system 140 (FIG. 1), the reviewer app or its support system can provide easy to understand diner feedback breakdowns, that give the restaurant detailed insights on each dish that was reviewed and the different components of the diners' general dining experience. The restaurant system and app can cooperate to link the review to the diner as known to the restaurant system; or the restaurant system can link the review to information in the restaurant system using information about the dishes served and time of service. The information can be used to drive restaurant consulting services, such as menu optimization, remodeling, and employee performance tracking, e.g., the quality of the service by the server or the quality of the cooking by the cook. Moreover, the restaurant system can focus highly targeted marketing campaigns on diners who, based on their reviews, have a higher probability of enjoying the dining experience provided by the restaurant.

Using the same technology, restaurants can link the app to a rewards program, so that the specific items in the rewards program are populated automatically from transaction information. Also, the app support system can optionally include modules that administrate and track any social media promotions the restaurants may be running, e.g., when the restaurants offer a discount for posting pictures from the users' dining experiences on social media. In addition, because the app can track the user's dining experiences long term, the app can provide to restaurants, with user permission, to the restaurants the users visit, from which the restaurants will be able to understand the longer term impact of their marketing campaigns and changes to their menus, prices, and other aspects of their service.

The same kind of real-time experience feedback and customer engagement services can be provided to other kinds of vendors through reviewer apps and their support systems.

In some implementations, an important feature of the reviewer app is that it can accept input for information-rich reviews, including ones that have text and graphic review elements as well as raw ratings, and submit those reviews without requiring any text input from the user. This is particularly advantageous when the app is used in situations where the user will want to spend as little time as possible using the app while entering reviews that are essentially contemporaneous with the experience being reviewed.

Such implementations present, on a user device, a user interface to receive input from the user. The user interface includes user interface elements to receive elements of a review of a restaurant experience, for example. The user interface elements include multiple panels, each of which can be used by the user to log one or more ratings of a respective aspect of the experience. The panels, when open, each show, as a user input element, an analog user interface element, as described above, for the user to use to input a rating for the item corresponding to the panel. The app presents, in each of the panels when the panel is open, an image corresponding to the rating set by the user using the analog user interface element of the panel, a rating text corresponding to the rating set by the user using the analog user interface element of the panel, or both. The images and the rating texts and correspondence between ratings images and ratings and rating texts are predetermined, that is, they are determined before the user begins entering a review. They may be default values or they may be values previously entered by the user. The user may elect to include the images, rating texts, and correspondences in the user's review so that other users can see the images and rating texts as well as the analog settings of the ratings entered by the user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

In addition, continuous input widgets other than scroll bars and sliders can be used, for example, rotatable wheels can be used. Also, the placement of user interface elements with the user interface panel may be different than shown, the selection element can be an element other than a button, and the images and texts on the buttons or other elements can be any images and text that express the same concepts. In addition, in some implementations, the user interface can be generated partly or entirely by server, in which case the features associate with tabs and buttons may be invoked by HTTP (Hypertext Transfer Protocol) requests sent to the server.

In addition, the reviewer app can be configured to provide an interface and store and share reviews for services other than restaurants, for example, professional services, such as doctor offices, dentists, and lawyers, or other services, for example, car service centers and spas, providing regions for generally applicable categories of information and regions for service-specific categories of information. The reviewer app can also be configured to provide an interface and store and share reviews for consumer packaged goods, for example, soaps and lotions, or electronic goods, for example, computers, smartphones, headphones, and other accessories.

In addition, multiple users who dine together can link their reviews to each other. In some implementations, the user can add an attendee to the experience using the add button 204 (FIG. 2B).

What is claimed is:

1. A system comprising:
    a user device; and
    one or more computers configured to interact with an app running on the user device and to perform operations comprising:
        presenting, on the user device, a user interface of the app running on the user device to receive input from a user, wherein the user interface includes elements to receive a review, from the user, of a restaurant, the app being connected to the restaurant being reviewed to provide reviews made through the user interface to the restaurant, the user interface elements including:
            a region having two or more panels each for receiving ratings of a respective general aspect of the restaurant;
            a region having two or more panels each for receiving ratings of a specific experience with a respective food item of the restaurant; and in each of the panels, a respective continuous input user interface element for a user to use to input a rating for the respective general aspect or the respective food item of the restaurant, wherein each panel for each dish when displayed has an open-closed button, and when the open-closed button on a panel for a dish is open, the user can add the dish to the review, and wherein user review input is stored by the app until the review is submitted even when the open-closed button for the dish is in a closed position, but the user review input is not part of the submitted review if the button for the dish is in the closed position when the review is submitted and that part of the review input is discarded;

receiving, by the app, and storing locally as reviewer data on the user device, images and corresponding ranges of image rating values, and phrases and corresponding ranges of phrase rating values;

selecting by the app, when a rating input is received from the continuous input user interface element of a panel, an image and a phrase according to a range of image rating values and a range of phrase rating values the rating input corresponds to, according to the stored reviewer data; and presenting the image and the phrase selected by the app in the corresponding panel.

2. The system of claim 1, wherein the continuous input user interface elements include a slider.

3. The system of claim 1, the operations further comprising:

receiving from the user a range of rating values corresponding to each image received from the user.

4. The system of claim 1, the operations further comprising:

receiving, by the app, from the user, phrases that correspond to each of a range of phrase rating values that can be set by the user in the continuous input user interface element of the panel.

5. The system of claim 1, wherein the user interface is a graphical user interface and presenting the user interface comprises presenting the user interface on a touch screen of a mobile device.

6. The system of claim 1, wherein the one or more computers comprise a computer that is part of the user device.

7. The system of claim 1, wherein the one or more computers are part of the user device.

8. The system of claim 1, wherein the user device is configured to connect, either directly or indirectly, to a restaurant point of sale or management service, to provide to the restaurant detailed insights on each dish that was reviewed.

9. The system of claim 1, wherein the app running on the user device is linked to a restaurant rewards program, wherein specific items in the rewards program are populated automatically in the user interface of the app on the user device.

10. The system of claim 1, wherein the user interface allows the user to provide additional or corrected menu data when the menu data shown in the user interface is incomplete or incorrect, including menu items not included in the menu data shown in the user interface and corrections to descriptions and prices.

11. The system of claim 1, wherein:

the regions having panels for receiving ratings of a specific experience with a respective food item are organized into panels, each for a respective category of dishes, wherein the categories and the dishes in the categories are obtained from restaurant menu information provided by the restaurant.

* * * * *